(12) United States Patent
Ore

(10) Patent No.: US 8,087,319 B2
(45) Date of Patent: Jan. 3, 2012

(54) TRANSMISSION INCLUDING A PARK ARRANGEMENT WITH COMBINATION DETENT/LATCH

(75) Inventor: Thomas G. Ore, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 409 days.

(21) Appl. No.: 12/468,891

(22) Filed: May 20, 2009

(65) Prior Publication Data

US 2010/0294069 A1   Nov. 25, 2010

(51) Int. Cl.
*G05G 5/06* (2006.01)

(52) U.S. Cl. .............. 74/473.25; 74/473.1; 74/473.21; 74/473.36

(58) Field of Classification Search .... 74/473.1–473.15, 74/473.21–473.25, 473.36, 473.37, 335, 74/340, 339
See application file for complete search history.

(56) References Cited

U.S. PATENT DOCUMENTS

| 4,377,093 | A | * | 3/1983 | Janson | 74/473.24 |
| 4,920,815 | A | * | 5/1990 | Reynolds | 74/335 |
| 5,487,318 | A | * | 1/1996 | Schott | 74/606 R |
| 5,517,876 | A | * | 5/1996 | Genise et al. | 74/473.24 |
| 6,155,126 | A | * | 12/2000 | Vogt et al. | 74/335 |
| 2007/0006673 | A1 | * | 1/2007 | Peterman et al. | 74/329 |
| 2008/0245174 | A1 | * | 10/2008 | Fischer et al. | 74/473.21 |
| 2008/0257084 | A1 | * | 10/2008 | Coxon | 74/335 |

* cited by examiner

*Primary Examiner* — Raymond Addie

(57) ABSTRACT

A transmission for a vehicle includes a shift rail movable in a longitudinal direction. The shift rail carries a fork engaging a shift collar. A shift block carried by the shift rail includes a latch and a detent. The latch is latchable with the shift rail for preventing longitudinal movement of the shift rail. A cross shaft extending transverse to the shift rail carries a shift arm engageable with the shift block.

27 Claims, 6 Drawing Sheets

TRANSMISSION INCLUDING A PARK ARRANGEMENT WITH COMBINATION DETENT/LATCH

FIELD OF THE INVENTION

The present invention relates to work machines, and, more particularly, to transmissions used in such work machines.

BACKGROUND OF THE INVENTION

A work machine, such as a construction work machine, an agricultural work machine or a forestry work machine, typically includes a prime mover in the form of an internal combustion (IC) engine. The IC engine may either be in the form of a compression ignition engine (i.e., diesel engine) or a spark ignition engine (i.e., gasoline engine). For most heavy work machines, the prime mover is in the form of a diesel engine having better lugging, pull-down and torque characteristics for associated work operations.

An IC engine in a work machine provides input power to a transmission, which in turn is coupled with and drives the rear axles through a rear end differential. The transmission, rear end differential and rear axles are sometimes referred to as the "rear end" of the work machine. The transmission typically is attached to the front of and provides input power to the rear end differential. The rear end differential provides ground power to the two rear axles. In the case of an agricultural work machine, the rear end differential also usually includes at least one power take-off (PTO) shaft extending rearwardly within the three point hitch arrangement at the rear of the tractor.

With a work machine as described above, it is common to provide a transmission with multiple shift ranges. Typically one shift lever is used to shift between multiple gear ranges (e.g., A, B, C and D gear ranges), and a second shift lever is used to shift between discrete gear pairs within each range (e.g., 1, 2, 3 or 4). The assignee of the present invention also markets a "PowerShift" series transmission in which at least one shift lever need not be foot clutched to shift "on-the-fly" during use. Variants of the PowerShift transmission go back to the 4020 series tractors manufactured in the 1960's.

Another type of transmission used in a work machine is an infinitely variable transmission (IVT) which provides continuous variable output speed from 0 to maximum in a stepless fashion. An IVT typically includes hydrostatic and mechanical gearing components. The hydrostatic components convert rotating shaft power to hydraulic flow and vice versa. The power flow through an IVT can be through the hydrostatic components only, through the mechanical components only, or through a combination of both depending on the design and output speed.

It is desirable to provide a transmission with a park feature, which can be configured as a "park lock" or a "park brake". A park lock is a mechanical device, and a park brake is a friction device. A park lock utilizes a compliant member in the actuation linkage since the mechanical locking teeth can "butt". If the locking teeth butt, the compliant member allows the operator to fully engage the actuation linkage in the locked position while the teeth are butted. The teeth will engage when a small motion of the tractor allows rotation between the two halves of the park lock. The compliant member in the actuation linkage then moves to the locked position.

A conventional park lock is in the form of a park pawl. The pawl is basically an arm with teeth at one end. The pawl operates perpendicular to the transmission shaft centerlines. Space for the pawl and it's actuation linkage is required outside the transmission shafts, which can be a limitation or not even possible in some applications.

What is needed in the art is a transmission with a park feature which is effective, smaller, reliable and easy to operate.

SUMMARY OF THE INVENTION

The invention in one form is directed to a transmission for a vehicle, including a shift rail movable in a longitudinal direction. The shift rail carries a fork engaging a shift collar. A shift block carried by the shift rail includes a latch and a detent. The latch is latchable with the shift rail for preventing longitudinal movement of the shift rail. A cross shaft extending transverse to the shift rail carries a shift arm engageable with the shift block.

The invention in another form is directed to a park arrangement for a transmission in a vehicle. The park arrangement includes a shift rail and a shift block carried by the shift rail. The shift block includes a latch and a detent. The latch is latchable with the shift rail for preventing longitudinal movement of the shift rail. The detent is engageable with a shift arm for providing tactile feedback to an operator during a park operation. A compression spring surrounds the shift rail and is engaged with an axial end of the shift block.

The invention in yet another form is directed to a work machine, including an engine and a rear end coupled with the engine. The rear end includes a transmission having a shift rail movable in a longitudinal direction. The shift rail carries a fork engaging a shift collar. A shift block carried by the shift rail includes a latch and a detent. The latch is latchable with the shift rail for preventing longitudinal movement of the shift rail. A cross shaft extending transverse to the shift rail carries a shift arm engageable with the shift block.

BRIEF DESCRIPTION OF THE DRAWINGS

FIG. 6 is a side, sectional view through the shift block shown in FIGS. 2-5, with the shift arm in the 3-4 rail, detent out and latch in;

FIG. 8 is a side, sectional view through the shift block shown in FIGS. 2-4, with the shift arm in park lock, detent out and latch in.

DETAILED DESCRIPTION OF THE INVENTION

Figure 1:
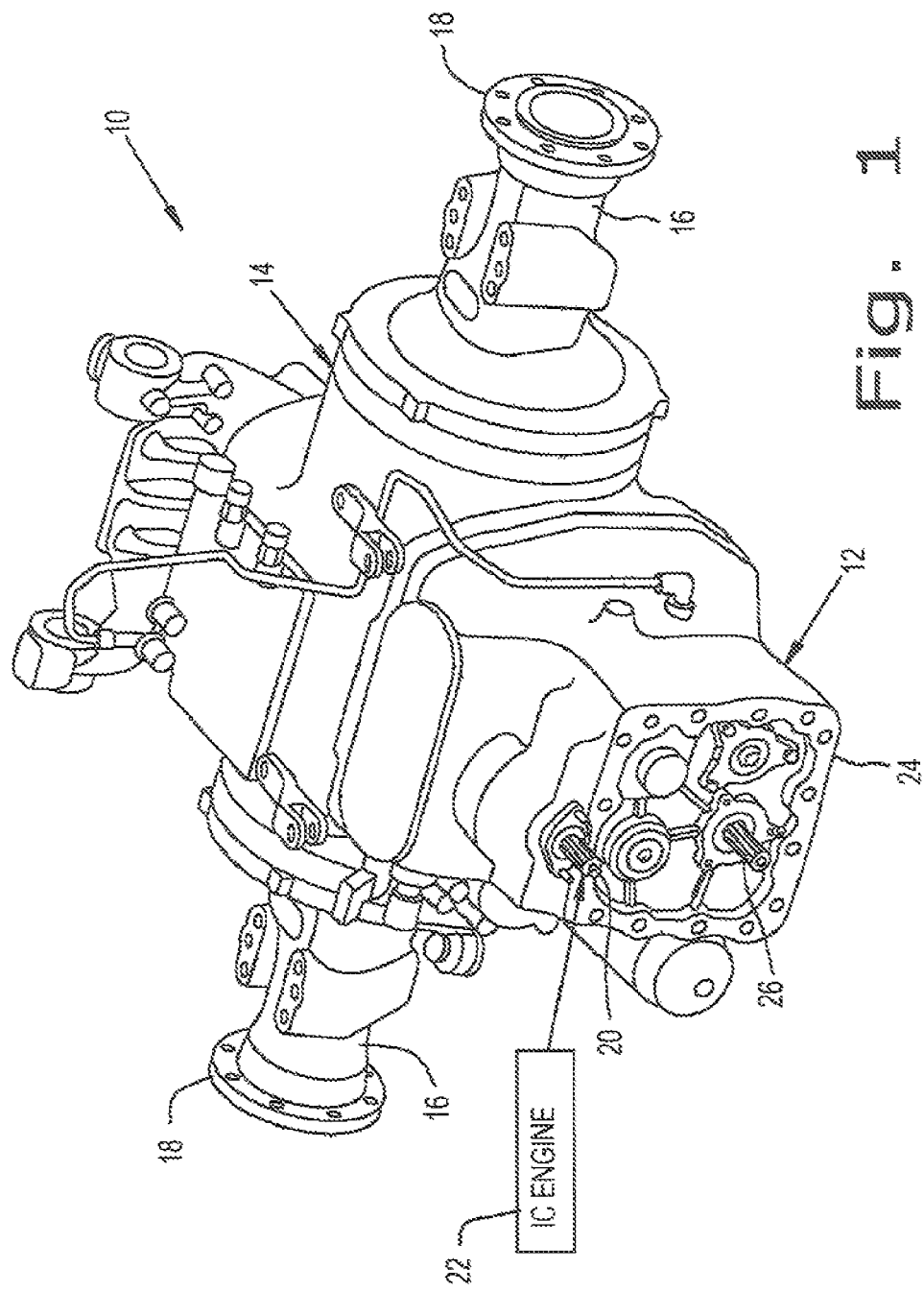
FIG. 1 is a perspective view of an embodiment of a rear end of the present invention used in a work machine in the form of an agricultural tractor.
Figure 2:
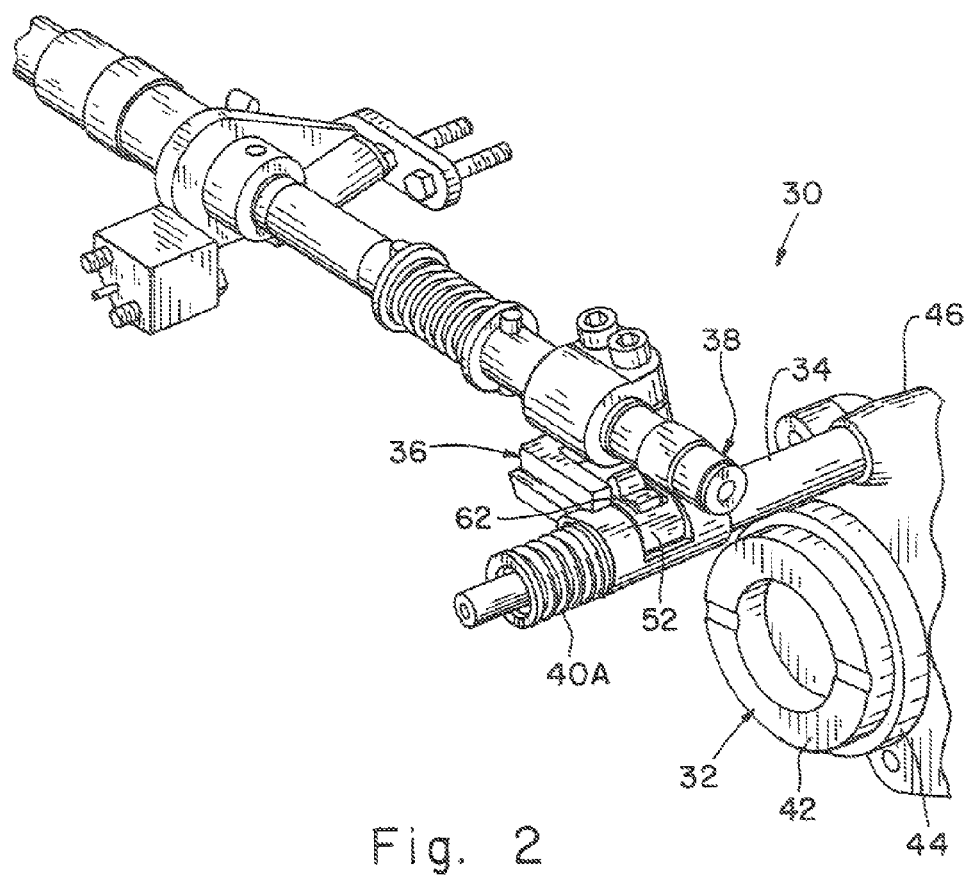
FIG. 2 is a perspective view of an embodiment of a park arrangement of the present invention, which may be used in the rear end shown in FIG. 1.
Figure 3:
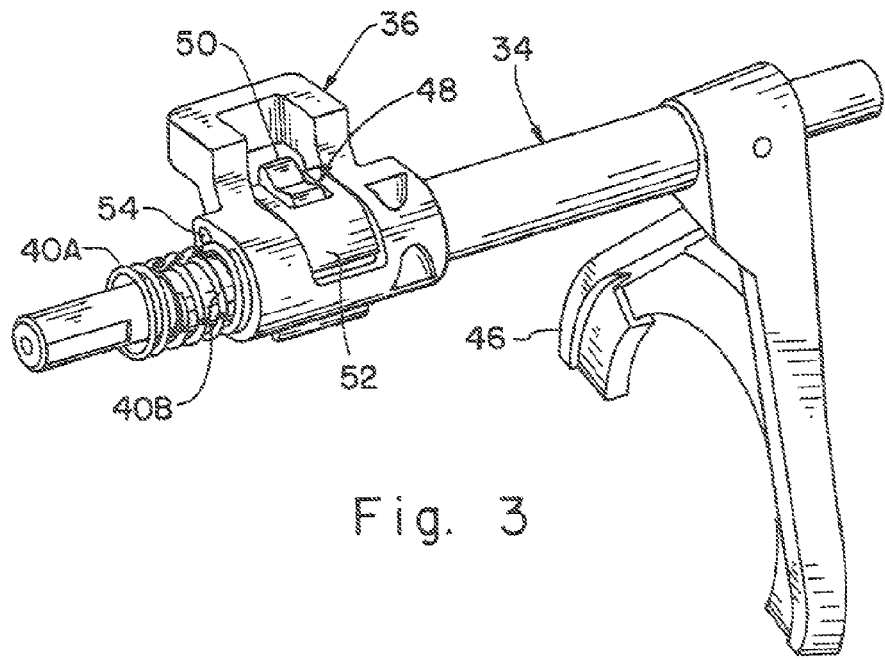
FIG. 3 is a perspective view of the shift rail and shift block in the park arrangement shown in FIG. 2.
Figure 4:
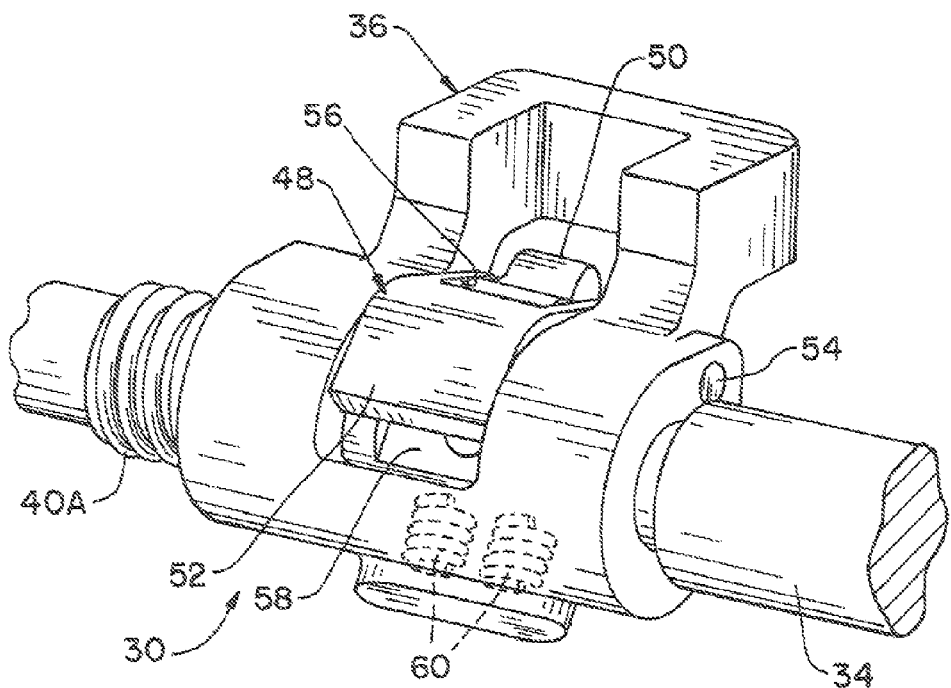
FIG. 4 is another perspective view of the shift rail and shift block shown in FIGS. 2 and 3.
Figure 5:
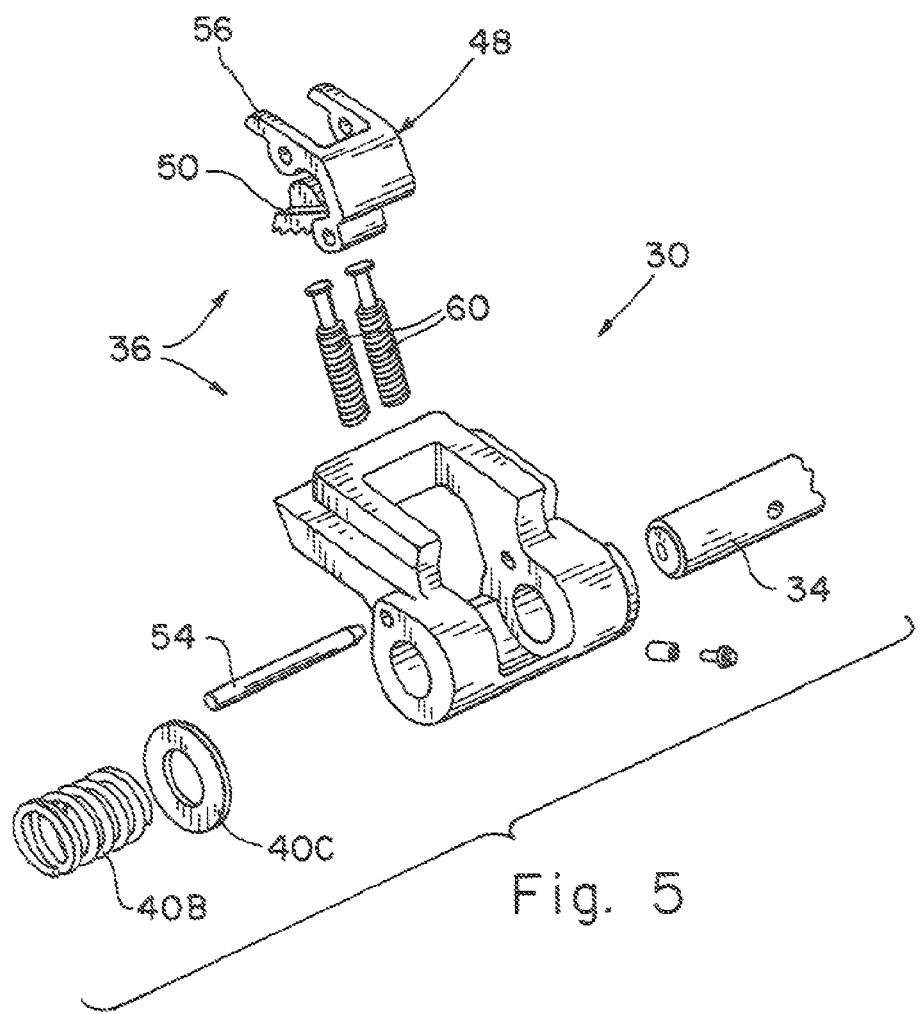
FIG. 5 is an exploded, perspective view of the shift rail and shift block shown in FIGS. 2-4.

Referring now to the drawings, and more particularly to FIG. 1, there is shown a portion of a vehicle or work machine 10 in the form of an agricultural loader tractor, particularly the rear end drive train of the tractor. Although shown as an agricultural tractor, it is possible that vehicle or work machine 10 could be in the form of a different type of vehicle or work machine, such as a construction tractor or forestry machine.

Tractor 10 includes a rear end with a transmission 12 which is coupled with a rear end differential 14, which in turn drives a pair of rear axles 16. Each rear axle 16 includes an outboard hub 18 to which a respective rear drive wheel (not shown) is mounted. Although rear axles 16 are shown configured for carrying respective drive wheels, it is also possible that rear end differential 14 can be configured for driving a pair of ground engaging tracks.

Transmission 12 includes a driven shaft 20 which is mechanically coupled with and receives rotational input power from IC engine 22, shown schematically in FIG. 1. Driven shaft 20 extends through and is rotatably carried by housing 24, which likewise houses and rotatably carries a number of other components. For example, housing 24 may carry a clutch arrangement (not shown), which selectively interconnects with output shaft 26 so that the mechanical front wheel drive (MFWD) is engaged by actuation of a switch (not shown) in the operator's station.

Driven shaft 20 also transfers rotational power to other internal transmission components positioned within transmission housing 24. Rotational power is then transferred, according to a selected gear ratio, to rear end differential 14.

More particularly, and according to an aspect of the present invention, transmission 12 includes a number of internal components which are shown more specifically in FIGS. 2-5. Namely, transmission 12 includes a park arrangement 30 with a shift collar 32, shift rail 34, shift block 36, cross shaft 38 and compression spring 40.

Shift collar 32 includes a pair of mating shift components 42 and 44 with mating teeth. Shift component 42 is splined to a shaft associated with other gears within transmission 12. Shift component 44 does not rotate and may be moved in an axial direction using park arrangement 30 to enmesh with shift component 42. When the teeth are enmeshed with each other, shift component 44 prevents rotation of shift component 42, thereby defining a park lock.

Shift rail 34 is carried within the housing of transmission 12 and is movable in longitudinal directions. Shift rail 34 carries a fork 46 engaging shift collar 32. More particularly, fork 46 fits within an annular peripheral groove formed in shift component 44 to axially move shift component 44 toward and away from shift component 42. Shift block 36 is mounted on and carried by shift rail 34. Shift block 36 includes a latch 48 and a detent 50. Shift block 36 allows longitudinal movement of shift rail 34 relative to shift block 36 when latch 48 is not latched with shift rail 34, and is substantially immovable relative to shift rail 34 when latch 48 is latched onto shift rail 34. More particularly, in the illustrated embodiment, latch 48 includes a paddle 52 which is pivotally connected with shift block 36. Latch 48 and detent 50 are carried by a common pivot pin 54 extending through shift block 36. Latch 48 includes a cut-out 56, and detent 50 is nested within cut-out 56.

Paddle 52 fits within a notch 58 formed in shift rail 34. When paddle 52 is latched into notch 58, shift block 36 is substantially immovable relative to shift rail 34, such that axial movement of shift block 36 in turn causes axial movement of shift rail 34, fork 46 and shift component 44.

Detent 50 provides tactile feedback to an operator when transmission 12 is moved into a park lock position. A pair of compression springs 60 bias detent 50 to the raised position. In the illustrated embodiment, detent 50 and latch 48 are separate parts so that if latch 48 is friction locked, detent 50 can still be overcome easily to allow the shift lever to be moved from the park locked position back to neutral. However, latch 48 and detent 50 can be formed integrally as a one piece design if the friction forces on latch 48 are low enough.

Compression spring 40A is positioned around shift rail 34 and engaged with an axial end of shift block 36 on a side opposite from fork 46. Spring 40A is interposed between shift block 36 and a fixed surface, such as a surface of the housing defining transmission 12, and thereby exerts a bias force against shift block 36. Spring 40A functions to return the park system to the disengaged position when the operator moves the shift lever out of the locked position. A concentric inner spring 40B pushes against the axial end of shift block 36 on one end and a washer 40C which is held in place on shift rail 34 using a spring pin or the like. Spring 40B in essence provides an axial tolerance or "play" which allows shift component 44 to be biased against shift component 42, even when the mating teeth therebetween do not actually align or butt, as will be described in more detail below.

Cross shaft 38 extends transverse to shift rail 34, preferably at a right angle as shown. Cross shaft 38 is movable in both rotational and longitudinal directions. Cross shaft 38 carries a shift arm 62 which is engageable with shift block 36. In the illustrated embodiment, shift arm 62 is generally J-shaped, but could be differently configured.

The present invention provides a park lock with a collar/washer configuration that fits within the transmission envelope with no impact on overall width, height or length of the transmission. The required compliant member in the event the teeth between shift components 42 and 44 do not match is the combination detent/latch (50/48) and compression spring 40.

Figure 6:
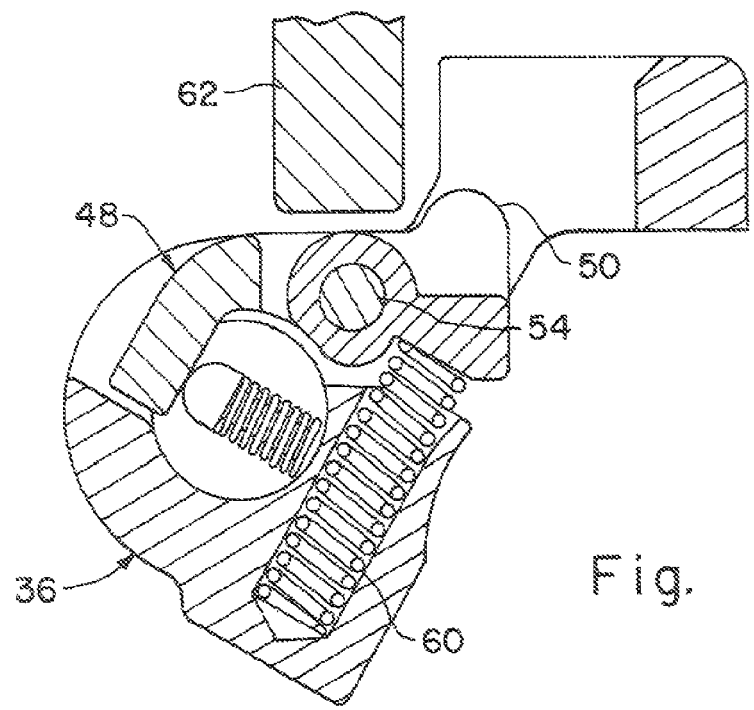
Figure 7:
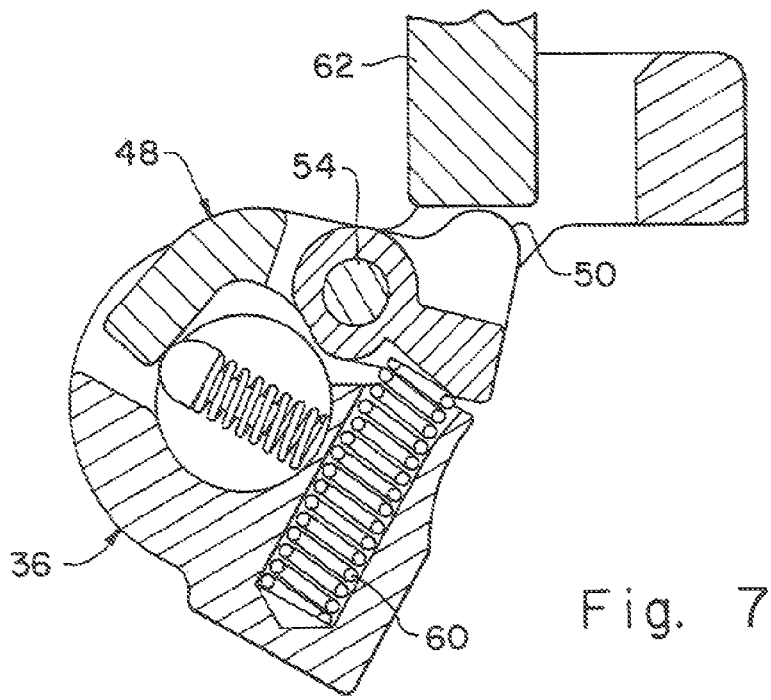
FIG. 7 is a side, sectional view through the shift block shown in FIGS. 2-4, with the shift arm in neutral, detent in and latch out.
Figure 8:
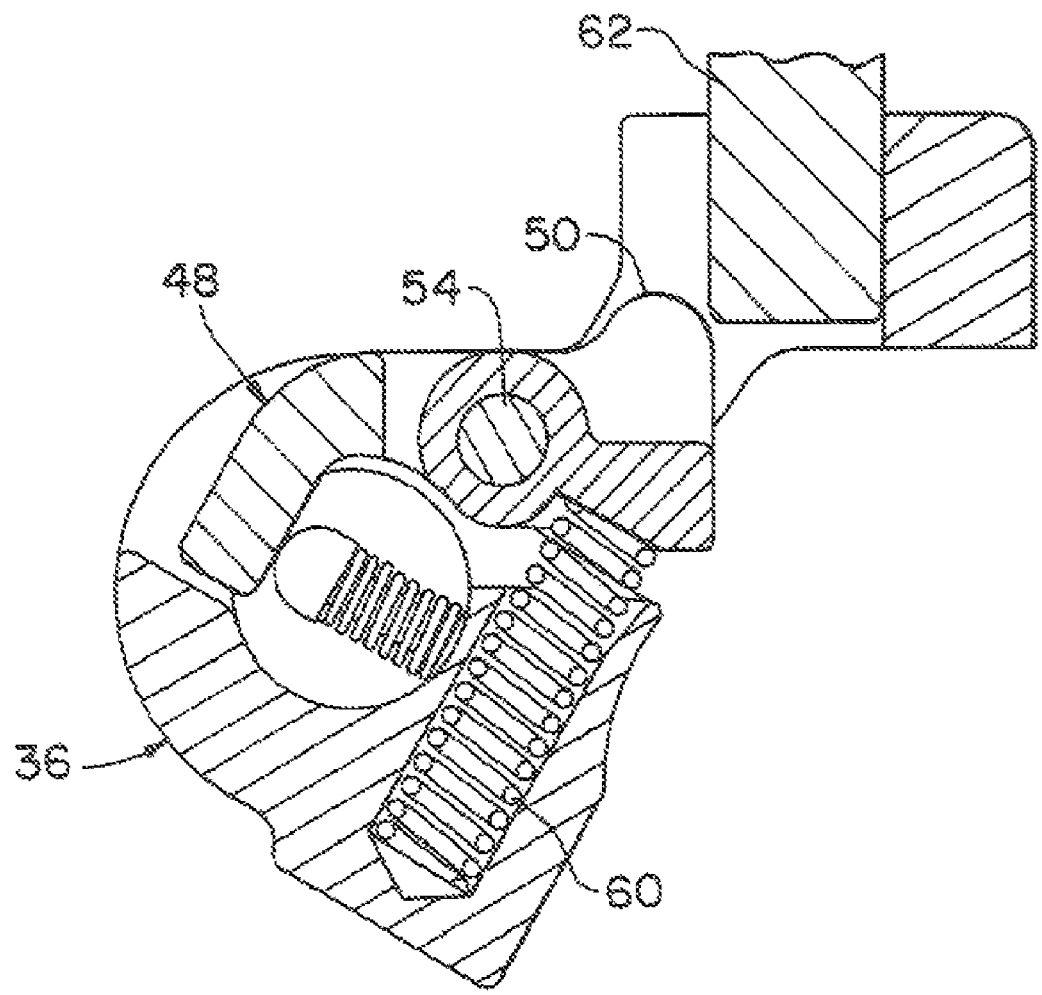

Referring to FIGS. 6-8, latch 48 and detent 50 are shown in various positions within shift block 36. FIG. 6 is a side, sectional view through shift block 36, with shift arm 62 in the 3-4 rail, detent 50 out, and latch 48 in. FIG. 7 is a side, sectional view through shift block 36, with shift arm 62 in neutral, detent 50 in, and latch 48 out. FIG. 8 is a side, sectional view through shift block 36, with shift arm 62 in park lock, detent 50 out, and latch 48 in.

During operation, shift collar 32 is moved by the shift rail linkage similar to that used for other gear collars: a shift fork, shift rail and shift block. Usually, shift blocks are pinned rigidly to the shift rail. However, with the present invention, shift block 36 allows differential movement between shift 36 block and shift rail 34, but has a positive lock when it is fully engaged. In addition, detent 50 provides tactile feedback to the operator. The same mechanism provides both the detent and positive lock. The differential motion is achieved by allowing shift block 36 to slide along shift rail 34, with inner spring 40B biasing an annular shoulder formed on shift rail 34 against shift block 36. If the shift collar teeth butt, the shift block 36 can move into a fully engaged position. Shift rail 34 stays in the butted position but is preloaded by spring 40B. When the teeth un-butt (by a small tractor movement), spring 40B pulls the shift rail forward and latch 48 snaps into notch 58 on shift rail 34—locking shift rail 34 in place. Detent 50 lifts latch 48 out of notch 58 when the operator is moving into the park position.

Having described the preferred embodiment, it will become apparent that various modifications can be made without departing from the scope of the invention as defined in the accompanying claims.

The invention claimed is:

1. A transmission for a vehicle, comprising:
   a shift collar;
   a shift rail movable in a longitudinal direction, said shift rail carrying a fork engaging said shift collar;

a shift block carried by said shift rail, said shift block including a latch and a detent, said latch being latchable with said shift rail for preventing longitudinal movement of said shift rail; and a cross shaft extending transverse to said shift rail, said cross shaft carrying a shift arm engageable with said shift block.

2. The transmission of claim 1, wherein said latch includes a paddle which is pivotally connected with said shift block.

3. The transmission of claim 2, wherein said shift rail includes a notch and said paddle is engageable within said notch.

4. The transmission of claim 2, wherein said latch and said detent are carried by a common pivot pin.

5. The transmission of claim 4, wherein said latch includes a cut-out, and said detent is nested within said cut-out.

6. The transmission of claim 2, wherein said latch and said detent are one of separate from each other and integral with each other.

7. The transmission of claim 1, including a compression spring surrounding said shift rail and engaged with an axial end of said shift block on a side opposite from said fork.

8. The transmission of claim 7, wherein said shift collar includes a pair of mating shift components with mating teeth, and said spring is configured to accommodate misalignment between said mating teeth during a park lock operation.

9. The transmission of claim 1, wherein said shift block is substantially immovable relative to said shift rail when said latch is latched onto said shift rail.

10. The transmission of claim 1, wherein said cross shaft is movable in both rotational and longitudinal directions.

11. The transmission of claim 1, wherein said shift arm carried by said cross shaft is generally J-shaped.

12. A park arrangement for a transmission in a vehicle, said park arrangement including:
    a shift rail;
    a shift block carried by said shift rail, said shift block including a latch and a detent, said latch being latchable with said shift rail for preventing longitudinal movement of said shift rail, said detent engageable with a shift arm for providing tactile feedback to an operator during a park operation; and
    a compression spring surrounding said shift rail and engaged with an axial end of said shift block.

13. The park arrangement of claim 12, wherein said latch includes a paddle which is pivotally connected with said shift block.

14. The park arrangement of claim 13, wherein said shift rail includes a notch and said paddle is engageable within said notch.

15. The park arrangement of claim 13, wherein said latch and said detent are carried by a common pivot pin.

16. The park arrangement of claim 15, wherein said latch includes a cut-out, and said detent is nested within said cut-out.

17. The park arrangement of claim 12, wherein said latch and said detent are one of separate from each other and integral with each other.

18. The park arrangement of claim 12, wherein said shift block is substantially immovable relative to said shift rail when said latch is latched onto said shift rail.

19. A work machine, comprising:
    an engine; and
    a rear end coupled with said engine, said rear end including
        a transmission, said transmission having:
        a shift collar;
        a shift rail movable in a longitudinal direction, said shift rail carrying a fork engaging said shift collar;
        a shift block carried by said shift rail, said shift block including a latch and a detent, said latch being latchable with said shift rail for preventing longitudinal movement of said shift rail; and
        a cross shaft extending transverse to said shift rail, said cross shaft carrying a shift arm engageable with said shift block.

20. The work machine of claim 19, wherein said latch includes a paddle which is pivotally connected with said shift block.

21. The work machine of claim 20, wherein said shift rail includes a notch and said paddle is engageable within said notch.

22. The work machine of claim 20, wherein said latch and said detent are carried by a common pivot pin.

23. The work machine of claim 22, wherein said latch includes a cut-out, and said detent is nested within said cut-out.

24. The work machine of claim 19, including a compression spring surrounding said shift rail and engaged with an axial end of said shift block on a side opposite from said fork.

25. The work machine of claim 19, wherein said shift block is substantially immovable relative to said shift rail when said latch is latched onto said shift rail.

26. The work machine of claim 19, wherein said cross shaft is movable in both rotational and longitudinal directions.

27. The work machine of claim 19, wherein said shift arm carried by said cross shaft is generally J-shaped.

* * * * *